United States Patent
Stange

(10) Patent No.: US 7,891,370 B1
(45) Date of Patent: Feb. 22, 2011

(54) IRRIGATION DEVICE WITH FREEZE MEMBER

(75) Inventor: Richard C. Stange, Oceanside, CA (US)

(73) Assignee: Hunter Industries, Inc., San Marco, CA (US)

( * ) Notice: Subject to any disclaimer, the term of this patent is extended or adjusted under 35 U.S.C. 154(b) by 73 days.

(21) Appl. No.: 12/049,172

(22) Filed: Mar. 14, 2008

(51) Int. Cl.
  *F16K 29/00* (2006.01)
  *E03B 7/10* (2006.01)
(52) U.S. Cl. .......................... 137/59; 137/549
(58) Field of Classification Search .................. 137/59, 137/544, 549, 550; 251/30.01, 30.02, 25
See application file for complete search history.

(56) References Cited

U.S. PATENT DOCUMENTS

| | | | | |
|---|---|---|---|---|
| 2,305,151 A | * | 12/1942 | Fields ........................... | 251/38 |
| 3,286,979 A | * | 11/1966 | Brown et al. .................. | 251/118 |
| 3,908,394 A | * | 9/1975 | Jacobus ......................... | 62/339 |
| 4,368,832 A | * | 1/1983 | Lambert ........................ | 222/509 |
| 5,582,205 A | * | 12/1996 | McCarty et al. ............... | 137/545 |
| 6,378,542 B1 | * | 4/2002 | DuHack ........................ | 137/8 |
| 6,546,959 B2 | * | 4/2003 | Cross et al. ................... | 137/627.5 |

* cited by examiner

*Primary Examiner*—Kevin L Lee
(74) *Attorney, Agent, or Firm*—Michael H. Jester

(57) ABSTRACT

An irrigation device includes a chamber having a peripheral wall made of a material susceptible to damage from the expansion of water in an interior of the chamber during freezing. A freeze member is located in the chamber and is made of a compressible material. The freeze member is configured to allow unfrozen water to pass through the chamber and to accommodate expansion of the water during freezing to prevent cracking or other damage to the peripheral wall.

10 Claims, 2 Drawing Sheets

IRRIGATION DEVICE WITH FREEZE MEMBER

FIELD OF THE INVENTION

The present invention relates to sprinklers and valves used to irrigate turf and landscaping.

BACKGROUND OF THE INVENTION

Many geographic locations have dry spells and/or insufficient rainfall requiring turf and landscaping to be watered to maintain the proper health of the vegetation. Turf and landscaping are often watered utilizing an automatic irrigation system that includes a programmable controller that turns a plurality of valves ON and OFF to supply water through underground pipes connected to sprinklers. Golf courses, playing fields and other large areas typically require rotor-type sprinklers that eject a long stream of water via a single relatively large nozzle that oscillates through an adjustable arc. In many cases golf courses utilize a rotor-type sprinkler having a built-in valve. These sprinklers are referred to in the irrigation industry as valve-in-head sprinklers.

In many parts of the United States it is necessary to winterize an automatic irrigation system by blowing out the water from the pipes, valves and sprinklers using compressed air. This is done to prevent damage to these components that would otherwise occur if residual water were to freeze and break these plastic structures during expansion. However, frequently there are pockets or regions in the system that still have residual water even after maintenance personnel have connected pressurized air to the system for an extended period of time. One such region that is particularly susceptible to this type of freezing damage is the small chamber associated with a pilot valve in either a valve-in-head sprinkler or a separate valve connected to a pipe that leads to a plurality of sprinklers.

SUMMARY OF THE INVENTION

In accordance with the present invention, an irrigation device includes a chamber having a peripheral wall made of a material susceptible to damage from the expansion of water in an interior of the chamber during freezing. A freeze member is located in the chamber and is made of a compressible material. The freeze member is configured to allow unfrozen water to pass through the chamber and to accommodate expansion of the water during freezing to prevent cracking or other damage to the peripheral wall.

BRIEF DESCRIPTION OF THE DRAWINGS

FIGS. 4A, 4B and 4C are side elevation, vertical cross-sectional and isometric views of the freeze tube utilized in the embodiment of FIG. 1.

DETAILED DESCRIPTION

Figure 1:
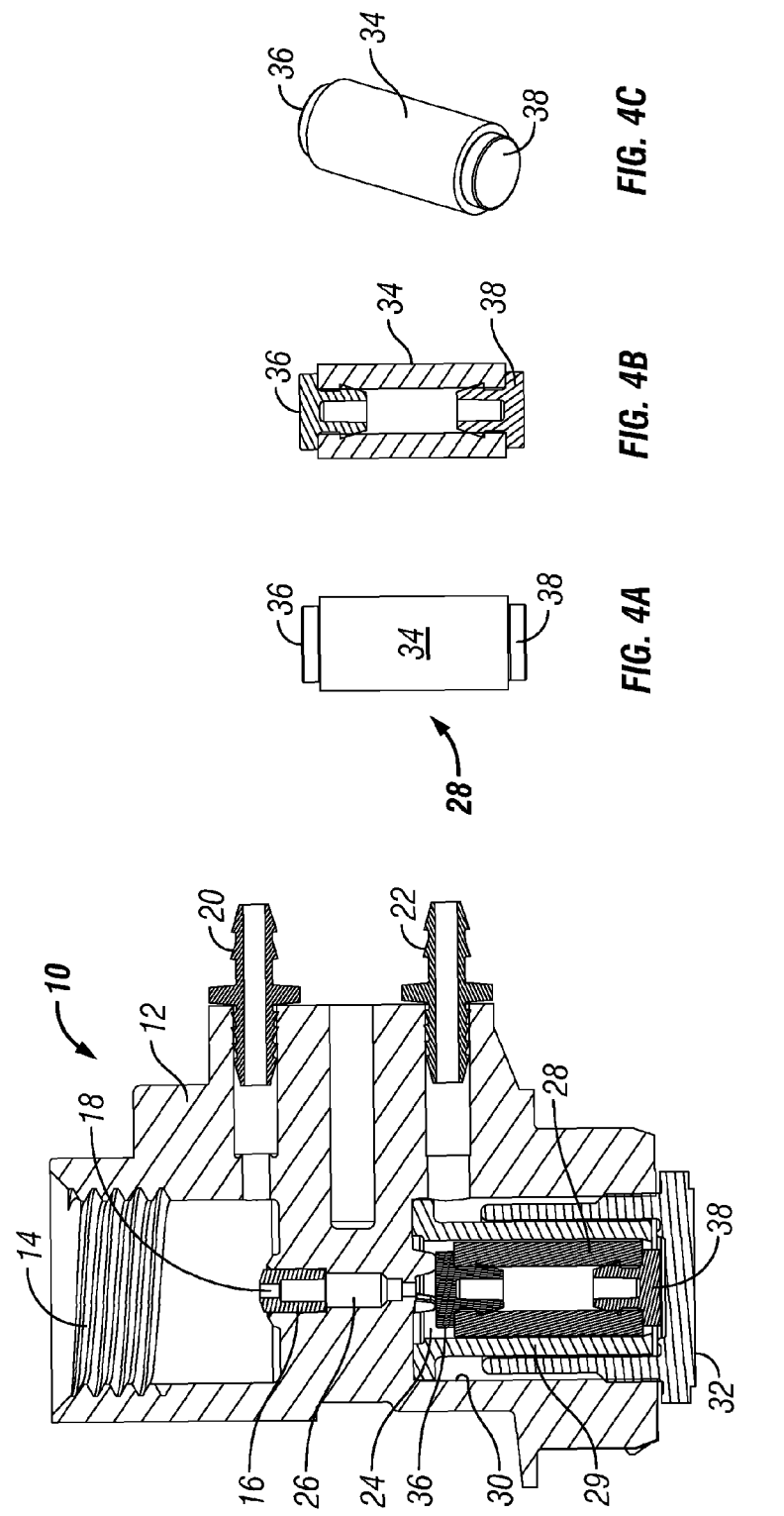
FIG. 1 is a cross-sectional view of a portion of an irrigation device in the form of a pilot valve assembly representing an embodiment of the present invention.
Figure 2:
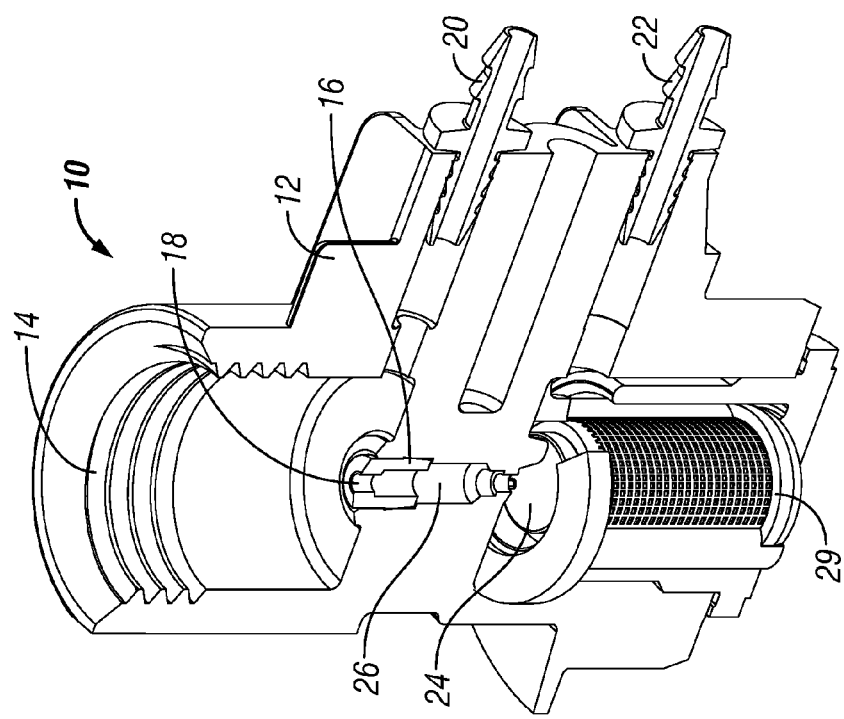
FIG. 2 is a fragmentary view of the pilot valve assembly of FIG. 1.
Figure 3:
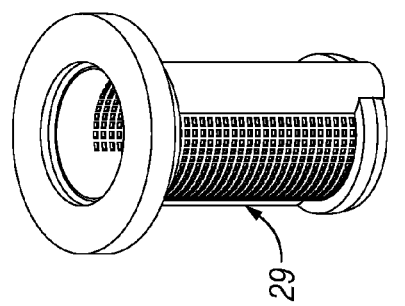
FIG. 3 is a perspective view of the filter screen of the pilot valve assembly of FIG. 1.

Referring to FIGS. 1 and 2, an irrigation device in the form of a pilot valve assembly 10 includes an injection molded plastic valve body 12 having internal passages formed therein. The pilot valve body 12 has a female threaded bore 14 for receiving a solenoid assembly (not illustrated) that has a plunger with an elastomeric boot that selectively engages a pilot valve member 16. The pilot valve member 16 has a small pilot orifice 18 that is sealed and unsealed by the elastomeric boot moved by the solenoid to selectively allow the flow of water through barbed fittings 20 and 22. The valve body 12 has a cylindrical chamber 24 with an interior that communicates with the pilot orifice 18 via stepped passage 26. The passage 26 forms part of a pilot valve chamber comprising chamber 24 and passage 26. A freeze member 28 is located in the chamber 24 and made of a compressible material such as an elastomer material. A cylindrical filter 29 (FIG. 3) surrounds the freeze member 28 and fits within the chamber 24. The freeze member 28 is configured to allow unfrozen water to pass through the chamber 24 and to accommodate expansion of the water during freezing to prevent cracking or other damage to the plastic valve body 12 and/or an end cap 32 that seals the chamber 24. During manufacture of the pilot valve assembly 10 the freeze member 28 is inserted into the filter 29. The freeze member 28 and filter 29 are then inserted into the chamber 24 and the end cap 32 is inserted into one end of the valve body 12, around the filter 29 and inside the peripheral cylindrical wall 30 of the chamber 24. The end cap 32 is held in place by suitable means such as detents, adhesive or sonic welding.

Referring to FIGS. 4A, 4B and 4C, the freeze member 28 includes a freeze tube 34 made of an elastomer material such as polyurethane. A pair of barbed end caps 36 and 38 are plugged into the opposite ends of the freeze tube 34. The interior of the freeze tube 34 is filled with air and the end caps 36 and 38 are sealed to the freeze tube 34. When residual water in the chamber 24 and/or passage 26 freezes, the freeze member 28 accommodates 9% volume expansion by compressing. This prevents cracking and breakage of the plastic valve body 12 and end cap 32 of the chamber 24 and other portions of the valve assembly 10 including the passage 26 and the pilot valve member 16.

The pilot valve assembly 10 can be part of a valve-in-head sprinkler such as that disclosed in U.S. Pat. No. 6,491,235 of Scott et al. granted Dec. 10, 2002 and entitled "Pop-up Sprinkler with Top Serviceable Diaphragm Module", the entire disclosure of which is hereby incorporated by reference. The pilot valve assembly 10 can also be part of a stand alone bonnet style diaphragm valve such as that disclosed in U.S. Pat. No. 5,996,608 of Richard E. Hunter et al. granted Dec. 7, 1999 and entitled "Diaphragm Valve with Filter Screen and Movable Wiper Element", the entire disclosure of which is hereby incorporated by reference. In the later case, the chamber 24 functions as the pilot valve chamber of the diaphragm valve. Both of the aforementioned patents are assigned to Hunter Industries, Inc., the assignee of the subject application.

Where the present invention is incorporated into a valve-in-head sprinkler, that device includes an outer case and an inner riser vertically reciprocable inside the case. The riser includes a turbine and a gear reduction for rotating a nozzle at an upper end of the riser. An inlet valve is mounted in a lower end of the outer case beneath the riser. The inlet valve is in communication with a pilot valve located away from the inlet valve. The pilot valve has a plastic valve body including a chamber with a peripheral wall and a pilot valve orifice communicating with the chamber. The valve further has a freeze member located in the chamber. The freeze member is configured to allow unfrozen water to pass through the chamber and to accommodate expansion of the water during freezing to prevent cracking or other damage to the peripheral wall.

Where the present invention is incorporated into a diaphragm valve, that device includes an outer housing enclosing a vertically reciprocable diaphragm assembly. A plastic valve body is connected to the outer housing and includes a pilot valve chamber that communicates with a pressure control chamber of the outer housing. The pilot valve chamber has a peripheral wall and a pilot valve orifice that communicates with the pilot valve chamber. A solenoid assembly is coupled to the valve body for opening and closing the pilot valve orifice. A freeze member is located in the pilot valve chamber. The freeze member is configured to allow unfrozen water to pass through the pilot valve chamber and to accommodate expansion of the water during freezing to prevent cracking or other damage to the peripheral wall of the pilot valve chamber.

While I have described and illustrated an embodiment of an irrigation device with a freeze member, it should be apparent to those skilled in the art that my invention could be modified in arrangement and detail. For example the freeze member need not have a tubular configuration and could be made of other compressible materials. It could be located in other parts of different irrigation devices. Therefore, the protection afforded my invention should only be limited in accordance with the scope of the following claims.

I claim:

1. A pilot valve assembly, comprising:
    a plastic valve body including a chamber having a peripheral wall and a pilot valve orifice communicating with the chamber; and
    a tubular freeze member made of a closed cell elastomer located in a first portion of the chamber, the freeze member being sized to allow unfrozen water to pass through a second portion of the chamber, the freeze member being sufficiently compressible to accommodate expansion of the water during freezing to prevent cracking or other damage to the peripheral wall.

2. The pilot valve assembly of claim 1 wherein the second portion of the chamber communicates with a pilot valve orifice.

3. The pilot valve assembly of claim 1 wherein the freeze member is surrounded by a filter.

4. The pilot valve assembly of claim 1 wherein the closed cell elastomer is polyurethane.

5. The pilot valve assembly of claim 1 wherein the chamber has a cylindrical configuration.

6. The pilot valve assembly of claim 1 wherein the valve body has a pair of barbed fittings.

7. The pilot valve assembly of claim 3 wherein the filter has a cylindrical configuration.

8. The pilot valve assembly of claim 1 wherein the valve body has a threaded bore for receiving a solenoid.

9. The pilot valve assembly of claim 1 wherein the pilot valve orifice is formed in a pilot valve member.

10. The pilot valve assembly of claim 5 wherein the freeze member is positioned co-axially within the chamber.

* * * * *